No. 12,734. REISSUED DEC. 24, 1907.

A. GILLIES.

PNEUMATIC MILKING APPARATUS.

APPLICATION FILED MAR. 8, 1907.

2 SHEETS—SHEET 1.

Witnesses

Walter C. Hart

William G. Holden

Inventor

Alexander Gillies by Geo. Bates & Son

Attorneys

No. 12,734. REISSUED DEC. 24, 1907.

A. GILLIES.

PNEUMATIC MILKING APPARATUS.

APPLICATION FILED MAR. 8, 1907.

2 SHEETS—SHEET 2.

Witnesses

Walter C. Hart

William G. Holden

Inventor

Alexander Gillies.

by Dan Watson & Sons

Attorneys

UNITED STATES PATENT OFFICE.

ALEXANDER GILLIES, OF HEIDELBERG, VICTORIA, AUSTRALIA.

PNEUMATIC MILKING APPARATUS.

No. 12,734. Specification of Reissued Letters Patent. Reissued Dec. 24, 1907.

Original No. 744,188, dated November 17, 1903, Serial No. 161,717. Application for reissue filed March 8, 1907. Serial No. 361,423.

*To all whom it may concern:*

Be it known that I, ALEXANDER GILLIES, a subject of the King of Great Britain, residing at 2 Brown street, Heidelberg, near Melbourne, in the State of Victoria, Commonwealth of Australia, and formerly of Terang, in the said State of Victoria, dairyman, have invented Improvements in Pneumatic Milking Apparatus, of which the following is a specification.

This invention relates to pneumatic milking apparatus; and it consists in certain improvements whereby the action of the calf's mouth is as nearly as possible simulated, so that there is no disposition to hold back the milk, which passes in a continuous flow from the teat-cup direct to receiver without surging.

Figure 1:
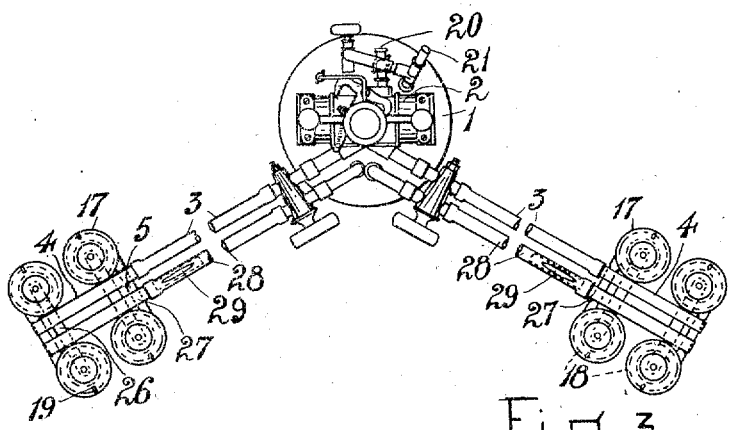
Figure 2:
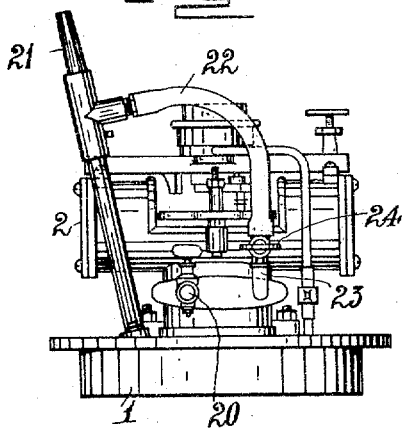
Figure 3:
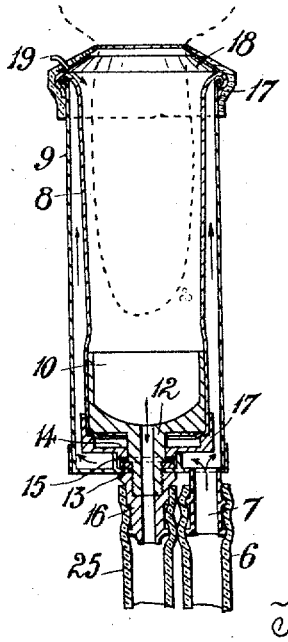
Figure 4:
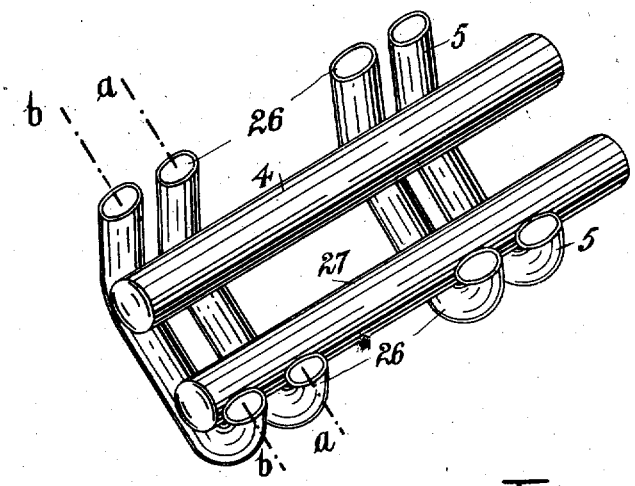
Figure 5:
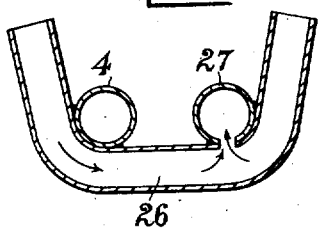
Figure 6:
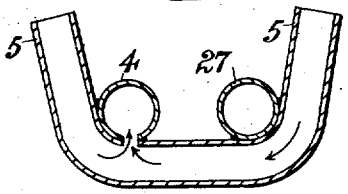

Referring to the accompanying drawings,—Figure 1 is a plan of the apparatus for milking two cows. Fig. 2 is an enlarged rear elevation illustrating certain connections. Fig. 3 is an enlarged central vertical section of the teat-cup. Fig. 4 is a perspective view of the "claw" or bracket; and Figs. 5 and 6 are respectively transverse sections on lines *a a* and *b b*, Fig. 4.

The pulsator illustrated is a Lawrence and Kennedy machine; but other constructions may be employed.

1 denotes the lid of the milk-receiver, adapted to hermetically seal same, and 2 the pulsator, while 3 indicates tubes or flexible pipes leading from the pulsator 2 through one passage 4 in the claw or bracket, and thence by way of branch pipes 5 and tubes 6, Fig. 3, to the ferrule 7, communicating with the space between the inner flexible lining 8 and outer rigid casing 9 of the teat-cup. The inner flexible lining 8 fits over a small cup 10 at the bottom, the lower edge being loose, so that it can be jammed or squeezed by the metallic cap 11, which fits over it so as to make a perfect joint. The cup 10 has a central passage through an extension 12, which projects through an opening in the cap 11, and the whole is tightened up by a nut 13. It will be seen that when the lining becomes stretched with wear it may readily be adjusted again. The inner lining being thus completed is inserted into the rigid casing 9, a square boss 14 taking a seating in a corresponding socket 15 on the bottom of the casing to prevent it turning while the nipple 16 is being screwed on. The upper edge of the lining 8 is turned over the top edge of the casing 9, and a rubber mouthpiece 17, having a flat annular rigid reinforcement 18, is then sprung over the top. With this construction of mouthpiece the cow's udder cannot be drawn into the teat-cup, and so cause pain to the animal.

Projecting through the mouthpiece is a very small pipe 19, or it may be an orifice, in order to admit a small quantity of air behind the milk, thereby utilizing atmospheric pressure to assist in conveying said milk to the receiver. The location of the point of air-admission may vary considerably, as in almost any part of the milk-passage between the mouthpiece and the receiver it is advantageous; but the best effect is produced as shown.

In the pulsator 2 the air is admitted through the cock 20, and the pulsations are conveyed, as before described, through tubes 3, passage 4, pipes 5, tubes 6, ferrule 7, to the space between the flexible lining 8 and casing 9 of the teat-cup. It is necessary in order that the action of the calf's mouth may be properly simulated that the pulsations should not in any case be delivered above the middle of the lining and should be preferably delivered at a point below where the tip of the teat reaches, for in that manner the lining is first distended at the top, where it grips the root of the teat, and gradually squeezes downwardly.

21 indicates the suction-pipe which passes through the lid 1. 22 is a branch connecting the draw-off pipe 23 with said suction-pipe, and 24 denotes a regulating-cock to control the rate of discharge, and consequently regulate the movement of the lining 8 on the teat. Furthermore, by conducting the discharged air direct to the suction instead of into the receiver, as heretofore, it results that there is no chance of oil from the pulsator getting into the milk.

25 represents the milk-tubes leading from the nipple 16 through branch pipes 26, one passage 27 of the claw or bracket, and tubes 28 to the receiver, so that there is a direct milk-passage from the cow's teat to the bucket or receiver. Thus it will be seen that there is an unbroken flow of milk and that surging is avoided. A short length of glass tubing 29 is inserted in each of the milk-tubes 28, so that the flow may be observed and the teat-cups removed at the proper time.

Having now particularly described and ascertained the nature of my said invention and in what manner the same is to be performed, I declare that what I claim is,—

1. In a pneumatic milking apparatus a teat-cup consisting of a rigid casing, a flexible lining therefor, a cup at the bottom of said lining, and a cap and nut for connecting the flexible lining to the cup at the bottom thereof, said cap having a boss adapted to fit into the base of said rigid casing, substantially as described.

2. In a pneumatic milking apparatus a teat-cup consisting of a rigid casing, a flexible lining therefor, a cap connected to the lower end of said lining and provided with an opening, in combination with a ferrule connected to the rigid casing for the admission of the pulsations between the lining and casing, said ferrule being below the middle of said lining, a pulsator communicating with said ferrule, and a milk-receptacle communicating with the said opening in said cap.

3. In a pneumatic milking apparatus a teat-cup consisting of a rigid casing, a mouth-piece therefor provided with a conical, annular rigid reinforcement, a flexible lining for the said casing, a small cup at the bottom of said lining, and a cap and nut for connecting said cup to said lining, said cap having a boss adapted to fit in the base of said casing.

4. In a pneumatic milking apparatus a teat-cup having a mouthpiece provided with a conical annular rigid reinforcement and a small air-inlet through the said mouthpiece for admitting atmospheric pressure behind the milk, said teat-cup further provided with a lining, a pulsator communicating with said cup back of the lining thereof, and a milk-receptacle communicating with the space between the said lining.

5. Pneumatic milking apparatus having teat-cups with inflatable linings and provided with a milk passage leading from the upper end thereof to the milk receiver, said passage having an air inlet to permit atmospheric pressure to assist in the flow of the milk.

6. Pneumatic milking apparatus having teat-cups with inflatable linings and provided with a milk passage leading from the upper end thereof to the milk receiver, and means for admitting air into said milk passage at the upper end of said teat-cup to assist in the flow of the milk.

7. Pneumatic milking apparatus having teat-cups with inflatable linings the mouthpiece of said teat-cups being provided with an air inlet to permit atmospheric pressure to assist in the flow of the milk.

8. In a pneumatic milking apparatus having teat-cups with inflatable linings, a mouthpiece for the teat-cup, and an air admission device extending through said mouthpiece to permit atmospheric pressure to the interior of the cup to assist in the flow of milk.

9. A pneumatic milking apparatus having teat-cups with inflatable linings, a permanently opened air tube interposed between the mouthpiece and the receiver and adapted to permit atmospheric pressure to the interior of the teat-cup to assist in the flow of milk.

10. A pneumatic milking apparatus having the mouth piece of the teat-cup provided with a permanently opened air inlet to permit atmospheric pressure to assist in the flow of milk and to prevent surging.

11. In a pneumatic milking apparatus, a mouth piece for the teat-cup, and a permanently opened tube extending through said mouth piece to permit atmospheric pressure to the interior of the cup to assist in the flow of milk and to prevent surging.

12. A pneumatic milking apparatus provided with a permanently opened air tube interposed between the mouth piece and the receiver and adapted to permit atmospheric pressure to the interior of the teat cup to assist in the flow of milk and to prevent surging.

In testimony whereof I have hereunto set my hand in presence of two subscribing witnesses.

ALEXANDER GILLIES.

Witnesses:

EDWARD WATERS,
EDWARD NEEDHAM WATERS.